May 31, 1966
C. H. SECORD
3,253,906
SLAGGING GRATE FURNACE AND METHOD
OF OPERATION THEREOF
Filed Dec. 11, 1961
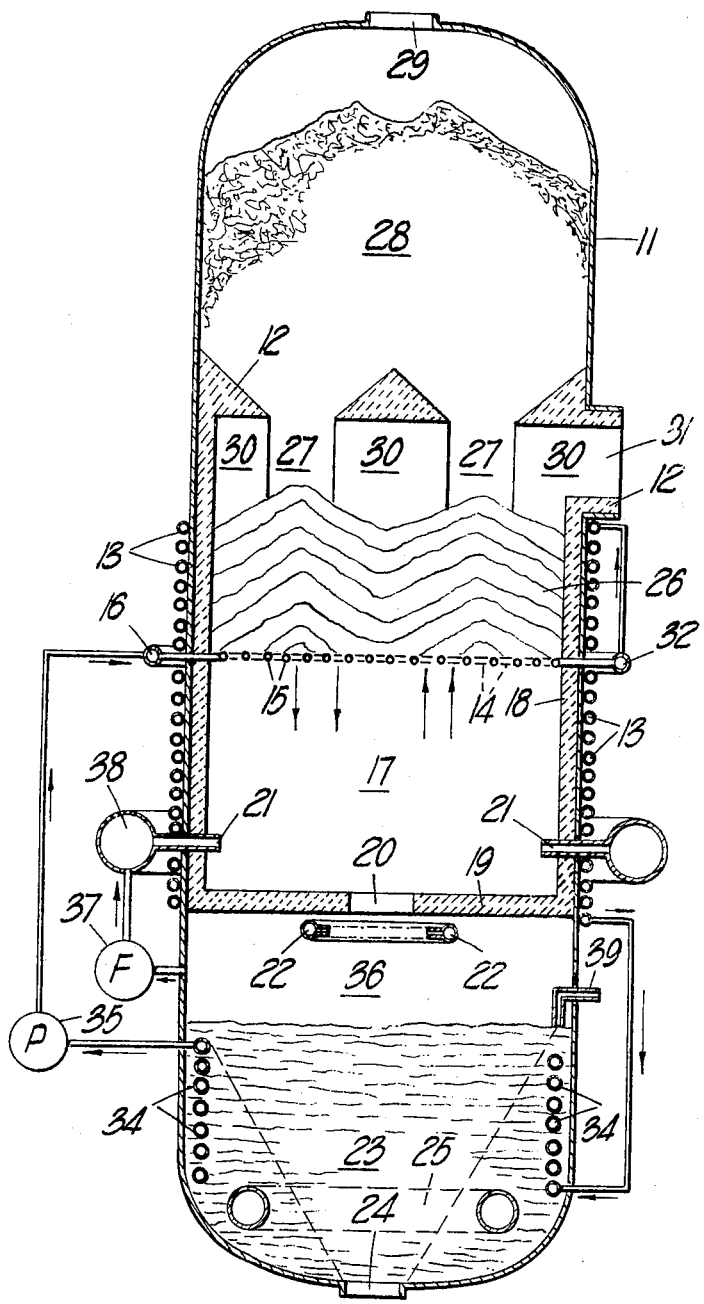
INVENTOR
CAMPBELL HERBERT SECORD
BY
Bacon & Thomas
ATTORNEYS __United States Patent Office__

3,253,906
Patented May 31, 1966

3,253,906
SLAGGING GRATE FURNACE AND METHOD OF
OPERATION THEREOF
Campbell Herbert Secord, "Little Cheverells" Markyate,
Hertfordshire, England
Filed Dec. 11, 1961, Ser. No. 158,453
Claims priority, application Great Britain, Dec. 14, 1960,
43,075/60
14 Claims. (Cl. 75—40)

This invention relates to furnaces, for example gas-producers or blast furnaces.

The invention provides, a method of operating a furnace in which combustion of solid materials is carried out in a bed supported on a cooled grate comprising hollow members through which cooling media is passed, which method comprises supplying oxygen for the combustion of the solid material from below the grate and through substantially the whole of the grate and cross-section of the bed of lump material at such a concentration and rate that the temperature in the reaction zone is sufficiently high to keep slag and other molten products which are produced during the combustion in a free flowing liquid state so that they and/or other molten products pass through the grate in a molten condition, the space below the grate being maintained at a temperature sufficient to ensure that solidification of the slag and other molten products does not occur on the underside of the grate to such an extent as to substantially interfere with passage of the oxygen-containing blast, or of the slag and other molten products through the grate.

It is to be understood that the hollow members are cooled sufficiently to withstand the high temperature of the reaction zone, but that their area is small enough to avoid solidification of the slag and other molten products, other than to form a protective layer of solid slag on the surface of the hollow members.

Preferably the oxygen-containing gas for the combustion is preheated, externally, or in a chamber below the grate, by partial combustion gaseous, liquid or solid fuel in the chamber, the chamber being provided with a refractory lined forehearth having one or more outlet holes for removal of molten material.

Oxygen for combustion may be supplied to the furnace as oxygen with steam or $CO_2$, oxygen-enriched air, or preheated air.

In the method of this invention a substantially uniform reaction zone is obtained across the base of the bed of solid material supported on the grate, and the slag and molten products are continuously removed from the bed across the whole area of the grate.

The solid lump material may comprise carbonaceous fuel, e.g. bituminous coal or coke the combination being carried out to produce fuel gas. Alternatively the solid material may comprise an ore of a metal or non-metallic element and carbonaceous lump fuel, the combustion being carried out to reduce the ore to the metal, or the non-metallic element.

The invention includes a furnace comprising a chamber for combustion of solid lump material, a grate for supporting a bed of the material in the chamber, comprising hollow members for passage of cooling media during the combustion and spaced to allow passage of molten material between the members, a chamber below the grate provided with a refractory lined forehearth having one or more outlet holes for removal of molten material, means for passing an oxygen-containing blast into the chamber so that in use the oxygen-containing blast passes up into the bed from below the grate, and means for supplying solid material to the bed, and for removing gaseous products from the top of the bed.

The forehearth chamber below the grate may be provided with nozzles or tuyeres for passage of oxygen-containing blast and/or gaseous liquid or pulverised solid fuel into the chamber.

The following is a description by way of example and with reference to the accompanying drawing of a furnace and methods of operating furnaces according to the invention.

The attached figure is a diagrammatic view in vertical section of one embodiment of a furnace for production of combustible gas from lump bituminous coal. The furnace is of circular cross-section and has walls composed of a mild steel pressure shell 11 lined with refractory material 12 and provided with cooling coils 13 supplied with water from the grate 14. The grate 14 comprises parallel pipes 15 extending transversely across the furnace and supplied with cooling water from a manifold 16. The pipes are made of stainless or austenitic steel. A forehearth chamber 17 is situated below the grate and is provided with a refractory wall lining 18 and floor 19, containing a central outlet 20 to discharge molten slag products falling into the chamber from the grate. The oxygen-containing blast is introduced into the chamber mainly through tangential or radial nozzles 21 fed by a bustle main 38 together with dust carryover and recycled make gas, and/or additional gaseous, liquid or granular solid fuel. This serves to preheat the blast by partial combustion before it enters the grate, and to keep the forehearth above the free-flowing temperature of the molten products and so to avoid their solidification, and by back-radiation to minimize cooling of the grate. Small oxy-gas burners 22 serve to prevent solidification of molten products as they leave the outlet 20.

Beneath the forehearth chamber 17 there is a water bath 23 in which the molten products are quenched and so converted into a granular frit. The frit settles out the exit 24 into a hydraulic lock chamber (not shown) by which it is removed periodically from the pressure system. Oxygen is passed into the water bath 23 by a sparge ring 25, where it is saturated to the extent of 30 to 70 volume percent steam by controlling the water temperature appropriately. The resulting oxygen/steam mixture is withdrawn from the quench chamber 36 by fan 37 and injected via bustle main 38 through nozzles 21 into forehearth 17. Some part of the blast may also enter the forehearth through the outlet 20.

The active bed of lump bituminous coal 26 is maintained continuously by feed down pipes 27 from reservoir 28, which is replenished periodically through inlet 29 from a lock chamber (not shown).

Combustible gas consisting mainly of carbon monoxide and hydrogen is produced by reaction of the blast rising through the grate 14 with lump coal 26 immediately above the grate, and passes up out of the bed 26 through spaces 30 between the pipes 27, and leaves the vessel through outlet 31 in the wall of the pressure vessel 11, to a cyclone (not shown) for removal of carryover dust.

Cooling water from the grate bars 15 enters a manifold 32, passes thence through shell cooling coils 13, and from them to heat exchange coil 34 in the water bath 23, and thence through circulating pump 35 back into the grate bars inlet manifold 16, in a closed circuit incorporating a pressure control (not shown) to prevent boiling. The cooling circuit may alternatively be operated with boiling and condensation. In either embodiment of the cooling circuit, means are also provided (not shown) to heat the circulating coolant externally, in order to keep the temperature of the water bath 23 up to the level required to saturate the blast oxygen as desired; or if too much heat is being delivered to the water bath, to hold its temperature down by addition of cold water to the bath via level control 39.

The furnace is operated in the following manner.

A bed of lumps of bituminous coal is formed on the grate tubes 15, the level of the bed being maintained during combustion by gravity feed through pipes 27. Water is circulated through the cooling circuit by pump 35. The chamber 17 is heated by burning a mixture of fuel gas and oxygen at the nozzles 21. Oxygen for combustion of fuel on the grate is introduced through the sparge ring 25. The fuel is heated and oxygen is blown through the bed to make fuel gas consisting mainly of carbon monoxide and hydrogen, the amount of hydrogen depending on the proportion of water vapour in the oxygen blast. When gasification of the fuel in the bed has started and the furnace is producing fuel gas part of this gas may be cycled to the burner and/or to nozzles 21.

The oxygen blast emanating from the sparge ring is supplied with such a content of steam and at such a rate that the temperature in the reaction zone in the bed 26 is sufficiently high to keep slag which is produced during the combustion in a free flowing liquid state so that it passes through the grate in a molten condition. Temperatures above 1300° C. are therefore generally maintained in the reaction zone, but preferably below 2000° C. Molten slag drips from the grate and is collected in the forehearth and falls through the outlet into the quench bath. The heating of the chamber 17 ensures that the slag does not solidify on the underside of the grate.

The admission of oxygen through the quench bath is a convenient way of introducing enough water vapour into the oxygen blast, so that hydrogen as well as carbon monoxide is made in the furnace, to hold the reaction temperature at its most efficient level. The temperature and level of the quench bath are carefully controlled by external addition of heat to the coolant circuit, or by addition of water to the water bath. The temperature of the reaction zone is conveniently adjusted by varying the amount of water in the oxygen blast. Thus this temperature may be lowered by increasing the proportion of water vapour by raising the quench bath temperature.

It has been found experimentally that the combination of high temperature and uniform reaction rate across the whole shaft cross-section permits the furnace to be operated at very high specific ratings, e.g. 4 cwt. (coke)/h./f.$^2$ at atmospheric pressure, compared with 1 to 2 cwt. in blast furnaces with 1 to 2 atmospheres gauge hearth pressure, and with 3 to 4 cwt. in a dry-ash grate gas producer at 25 atmospheres. Experiments have also shown that reactions to produce combustible gases are completed with high efficiency (low undecomposed steam and carbon dioxide and low exit gas temperature) in a very shallow bed depth, of the order of one to two feet, preferably 18 to 24 inches with −1″ coke as fuel. This greatly facilitates uniform descent of the fuel in the bed; it also minimizes effects of caking of bed fuels containing volatiles (such as bituminous coal), and of hanging due to molten slag blown up by the gases into cooler parts of the bed above the reaction zone, as a result of very low solids residence times.

In these experiments oxygen for combustion was passed through the grate at rates varying from 750, preferably 1000 to 3000 s.c.f. per hour per sq. ft. of the grate and the temperature of the combustion zone was varied from 1300 to 2000° C. The pressure drop across the furnace was within the range 1″ to 6″ wg.

It has been found that under the operating conditions a protective layer of solidified slag is formed on the cooled grate tubes and thus reduces the heat drawn on the reaction which amounts to about 3% at atmospheric pressure, but proportionately less as rating is increased by operation at higher pressures. It was found during the operation of the furnace that the presence of fine coal in the bed led to slagging difficulties.

An analysis of the fuel gas produced by the furnace when operating on coal at atmospheric pressure with a saturation temperature at 77° C. was as follows:

|  | Percent |
|---|---|
| $CO_2$ | 6.2 |
| $O_2$ | 0.1 |
| $C_nH_m$ | 0.5 |
| $H_2$ | 31.4 |
| $CO$ | 57.0 |
| $CH_4$ | 2.8 |
| $C_2H_6$ | 0.1 |
| $N_2$ | 1.9 |

The invention is not limited to the details of the foregoing example; for instance steam or other cooling media, such as a liquid alkali metal may be used for cooling the grate. The cooling media may be passed to a suitable heat exchanger.

The heating means for the forehearth chamber may be omitted in which case the outlet hole in the floor is enlarged.

When a forehearth is present the spaces between the tubes forming the grate may be sufficiently large to permit lump fuel to pass through the grate. In such a case the oxygen blast is adjusted so that combustion of this lump fuel will take place in the chamber below the grate.

In the method of the invention a furnace may be operated essentially at atmospheric pressure, or at elevated pressures of 2 up to 50 or even 100 atmospheres without modification of its essential character, by containing the furnace within a pressure vessel suitably insulated and cooled from the hot reaction zones, and supplying the blast and fuels to the furnace at its working pressure.

The invention may be employed to produce (a) primarily or exclusively sensible heat in the gas leaving the fixed bed resting on the grate (as in a boiler); (b) primarily potential heat in that gas, as in a gas producer; or (c) to recover metal products from oxide constituents of the fuel ash or of added mineral materials such as metallic ores by the action of the strongly reducing gases produced by combustion of carbonaceous lump fuel, as in a blast furnace. For example, zinc vapor may be produced from zinc-containing ores.

The method of the invention may also be employed for the production of non-metallic products by reduction and/or smelting. For example, elemental phosphorus may be produced from phosphate rock.

I claim:

1. A method of operating a furnace in which combustion of solid lump materials is carried out in a bed supported on a cooled grate comprising hollow members through which cooling media is passed, which method comprises supplying oxygen-containing gas for the combustion of the solid material from below the grate and through substantially the whole of the grate and crosssection of the bed of lump material at such a concentration and rate that the temperature in the reaction zone is sufficiently high to keep slag and other molten products which are produced during the combustion in a free flowing liquid state so that slag and other molten products pass through the grate in a molten condition, the space below the grate being heated by burning a fuel therein to maintain said space at a temperature sufficient to ensure that solidification of the slag and other molten products does not occur on the underside of the grate to such an extent as to substantially interfere with passage of the oxygencontaining gas, slag and other molten products through the grate.

2. A method as claimed in claim 1 wherein the oxygen-containing gas for the combustion is preheated by partial combustion of a fuel in a chamber below the grate, the chamber being provided with a refractory lined forehearth having at least one outlet hole for removal of molten material.

3. A method as claimed in claim 2 wherein the solid lump material comprises carbonaceous fuel selected from the group consisting of bituminous coal and coke and the combustion is carried out to produce a combustible fuel gas.

4. A method as claimed in claim 3 wherein part of the fuel gas is fed to the chamber below the grate and burnt to preheat the oxygen for the combustion.

5. A method as claimed in claim 2, wherein the oxygen is admitted to the chamber through the outlet hole for molten material.

6. A method as claimed in claim 1 wherein the furnace is operated at elevated pressure or from 2 to 50 atmospheres gauge.

7. A method as claimed in claim 1, wherein the oxygen containing gas is passed through the grate at a rate of from 1000 to 3000 s.c.f. per hr. per sq. ft. of the grate.

8. A method as claimed in claim 1 wherein water vapour is included in the oxygen-containing gas.

9. A method as claimed in claim 1 wherein the temperature in said reaction zone in the bed is from 1300 to 2000° C.

10. A method as claimed in claim 1 wherein the solid material comprises a metallic ore and carbonaceous lump fuel, the combustion being carried out to reduce the ore to the metal.

11. A method as claimed in claim 1 wherein the depth of the bed of solid lump material is from 1 to 2 feet.

12. A method of operating a furnace in which combustion of solid lump materials is carried out in a bed supported on a cooled grate comprising hollow members through which cooling media is passed, a quench chamber containing a water quench bath being provided below the grate, which method comprises supplying oxygen-containing gas for the combustion of the solid material from below the grate and through substantially the whole of the grate and cross-section of the bed of lump material at such a concentration and rate that the temperature in the reaction zone is sufficiently high to keep slag and other molten products which are produced during the combustion in a free flowing liquid state so that slag and other molten products pass through the grate in a molten condition, a stream of oxygen-containing gas also being passed through the quench bath, thereby including water vapour in said stream and then passing said stream into the main supply of oxygen-containing gas below the grate, the space below the grate being heated by burning a fuel therein to maintain said space at a temperature sufficient to ensure that solidification of the slag and other molten products does not occur on the underside of the grate to such an extent as to substantially interfere with passage of the oxygen-containing gas, slag and other molten products through the grate.

13. A furnace comprising:
(a) a chamber for combustion of solid lump material,
(b) a grate for supporting a bed of the material in the chamber and extending over substantially the whole cross-section thereof, said grate comprising hollow members for passage of cooling media during the combustion and spaced to allow passage of molten material between the members,
(c) a chamber below the grate provided with a refractory lined forehearth having at least forehearth having at least one outlet hole for removal of molten material,
(d) means for passing an oxygen-containing blast into the chamber so that in use the oxygen-containing blast passes up into the bed from below the grate,
(e) means for supplying solid material to the bed,
(f) means for removing gaseous products from the bed,
(g) a quench chamber for a water quench bath for molten products at the base of said chamber below the grate, and
(h) means for passing the oxygen-containing gas through the quench chamber and then into the oxygen-containing blast in order to add water vapour to the oxygen-containing blast.

14. A furnace as claimed in claim 13 wherein the quench bath contains heat exchange means whereby the quench bath is heated by circulation of grate and wall-cooling fluid through said heat exchange means.

References Cited by the Examiner

UNITED STATES PATENTS

| Re. 16,252 | 1/1926 | Catlin | 48—203 X |
|---|---|---|---|
| 40,925 | 12/1863 | Gwynne | 48—210 |
| 333,693 | 1/1886 | Stewart | 48—67 |
| 803,444 | 10/1905 | Sinn et al. | 48—63 |
| 1,098,534 | 6/1914 | Servais | 48—63 |
| 1,341,517 | 5/1920 | Perry | 48—63 |
| 1,716,084 | 6/1929 | Percy. | |
| 1,938,139 | 12/1933 | Ekelund | 48—203 |
| 2,200,607 | 5/1940 | Stryker | 48—196 X |
| 2,800,396 | 7/1957 | Udy | 23—223 |
| 2,920,951 | 1/1960 | Bretschneider et al. | 75—86 X |
| 2,961,310 | 11/1960 | Steever | 48—206 |

FOREIGN PATENTS 1,069,316  1/1957  Germany.

MORRIS O. WOLK, Primary Examiner.

MAURICE A. BRINDISI, Examiner.

EDWARD STERN, DELBERT GANTZ,
JOSEPH SCOVRONEK, Assistant Examiners.